United States Patent [19]

Herring et al.

[11] Patent Number: 5,061,743
[45] Date of Patent: Oct. 29, 1991

[54] 3-HYDROXYBUTYRATE POLYMER COMPOSITION

[75] Inventors: John M. Herring; Andrew Webb, both of Cleveland, England

[73] Assignee: Imperial Chemical Industries PLC, London, England

[21] Appl. No.: 530,560

[22] Filed: May 30, 1990

[30] Foreign Application Priority Data

May 30, 1989 [GB] United Kingdom ............... 8912388

[51] Int. Cl.$^5$ ............................................. C08L 67/04
[52] U.S. Cl. .................... 524/130; 524/132; 524/133; 524/135; 524/394; 524/396; 524/397; 524/399; 524/400; 524/409; 524/434; 524/436; 524/437; 524/599
[58] Field of Search ............... 524/130, 132, 133, 135, 524/396, 394, 397, 399, 400, 409, 434, 436, 437, 599

[56] References Cited

U.S. PATENT DOCUMENTS

| | | | |
|---|---|---|---|
| 3,594,347 | 7/1971 | Lazarus et al. ................. | 524/133 X |
| 3,894,986 | 7/1975 | Racky et al. .................... | 524/130 X |
| 4,038,258 | 7/1977 | Singh et al. ..................... | 524/130 X |
| 4,180,495 | 12/1979 | Sandler ............................ | 524/133 X |
| 4,237,034 | 12/1980 | Tomka et al. ................... | 524/130 |
| 4,701,518 | 10/1987 | Osborn et al. .................. | 524/130 X |

*Primary Examiner*—Earl Nielsen
*Attorney, Agent, or Firm*—Cushman, Darby & Cushman

[57] ABSTRACT

Certain hydroxy alkanoate polymers, such as 3-hydroxybutyrate polymers, when obtained by solvent extraction from fermentation masses, can have long cycle times during thermal processing due to a low rate of crystallization. A combination of (a) an organophosphonic or organophosphoric acid or ester with (b) an oxide, hydroxide, or carboxylate of a metal of Groups I to V is an effective nucleating agent.

11 Claims, No Drawings

3-HYDROXYBUTYRATE POLYMER COMPOSITION

This invention relates to a hydroxyalkanoate polymer composition and to a process for the production thereof and in particular to a 3-hydroxybutyrate polymer composition and to a process for the production thereof.

Poly(3-hydroxybutyrate) is a thermoplastic polyester consisting of repeat units of the formula:

—CH(CH$_3$).CH$_2$.CO.O— which is accumulated by many micro-organisms, particularly bacteria, for example of the genera Alcaligenes, Athiorhodium, Azotobacter, Bacillus, Nocardia, Pseudomonas, Rhizobium, and Spirillium, as an energy reserve material.

The polymer is conveniently prepared by cultivating the micro-organism in an aqueous medium on a suitable substrate, such as a carbohydrate or methanol, as an energy and carbon source. The substrate must, of course, be one that is assimilable by the micro-organism. In order to promote accumulation of the polymer, at least part of the cultivation is preferably conducted under conditions wherein there is a limitation of a nutrient that is essential for growth of the micro-organism but which is not required for polymer accumulation. Examples of suitable processes are described in European Patent Specifications 15669 and 46344.

Polymers containing both 3-hydroxybutyric units and other hydroxy-carboxylate units, such as 3-hydroxyvalerate units, can also be produced microbiologically. Thus a microbiologically produced heteropolymer containing 3-hydroxybutyrate and 3-hydroxyvalerate residues is described by Wallen et al in "Environmental Science and Technology", 8, (1974), 576–9. Also, as described in European Patent Specifications 52459 and 69497 various copolymers can be produced by cultivating the microorganism on certain substrates, such as propionic acid which gives rise to 3-hydroxyvalerate units in the copolymer.

While cells containing the polymer can be used as such as a molding material, for example as described in U.S. Pat. No. 3,107,172, it is generally desirable to separate the polymer from the remainder of the cell material.

Methods that have been proposed to effect this separation include breakage of the cells by methods such as treatment with acetone, followed by extraction of the polymer from the broken cells by treatment with a solvent in which the polymer is soluble. Examples of such processes are described in U.S. Pat. Nos. 3,036,959 and 3,044,942 in which the solvents employed are pyridine or mixtures of methylene chloride and ethanol. Other extraction solvents for the polymer in the form in which it is produced in the cells include cyclic carbonates such as 1,2-propylene carbonate (see U.S. Pat. No. 4,101,533); chloroform (see U.S. Pat. No. 3,275,610); and 1,2-dichloroethane (as disclosed in European Patent Specification 15123).

U.S. Pat. No. 3,275,610 discloses other methods of cell breakage viz. ultrasonic vibration, grinding, French pressing, freezing/thawing cycles and lysozyme treatment, while as described in European Patent Specification 15123, spray or flash drying of the suspension of cells as produced by culturing the micro-organism can also cause sufficient cell breakage to enable the polymer to be extracted from the cells.

Copolymers can also be made containing units of other hydroxycarboxylic acids and/or units derived from diols, e.g. ethylene glycol, and/or dicarboxylic acids, e.g. isophthalic acid, by ester interchange occurring when the microbiologically produced polymer or copolymer is melted with such a hydroxycarboxylic acid, lactone thereof, e.g. pivalolactone, diol, dicarboxylic acid and/or polyester produced therefrom.

In the following description therefore, by the term HB polymer we mean not only 3-hydroxybutyrate homopolymer, but also copolymers as described above, provided that 3-hydroxybutyrate residues form at least part of the polymer chain.

However, the rate of crystallization of these polymers is slow due to the low nucleation density. In copolymers containing hydroxyvalerate units (HV copolymers), the nucleation density is dependent upon the hydroxyvalerate and falls as this content increases. This resultant low rate of crystallization leads to long cycle times during thermal processing, e.g. injection molding, and the development of large spherulites. The presence of large spherulites may significantly reduce the physical and mechanical properties of the molding polymer. To allow these polymers to be processed at an economic rate and to improve the physical and mechanical properties it has been found necessary to include a nucleating agent.

HB polymers can be made into shaped objects using known shaping techniques under conditions such that crystallization of the polymers usually takes place. As a result of this crystallization there can be formed non-homogenous crystalline structures containing spherulites of significant size. The presence in HB polymers of spherulites which are too large can significantly reduce the physical and mechanical properties of the polymers. It has therefore been found to be important to contain spherulite size produced during crystallization of HB polymers.

An additional important factor in polymer processing is the crystallization rate. The use of nucleating agents increases the nucleation densities which in turn increases the overall rate of crystallization leading to smaller diameter spherulites. Increased crystallization rates lead to reduced cycle times in processing steps such as injection moulding.

In the production of crystalline linear polyesters from polymerised lactones, e.g. beta-lactones, it has been found to be important to reduce the size of spherulites produced during crystallization. In GB 1,139,528 it is disclosed that spherulite size reduction during the production of polyesters from polymerised lactones can be achieved by crystallizing the polyesters in the presence of certain nucleating compounds. The nucleating compounds whose use is described in GB 1,139,528 are (a) alkali metal chlorides, bromides and iodides and boron nitride; and (b) salts of mono-, and di, and trivalent metals with aromatic carboxylic, sulfonic and phosphinic acids.

Nucleating agents have also been used to improve the properties of molded polyamides such as nylon 66, particularly to impart a fine grained uniform structure to products produced from the polyamides which, as a result, have a uniform fine grain structure. Use of nucleating agents in polyamides leads to increased crystallization rates and reduced injection molding cycle times. GB 1,465,046 discloses a method for the production of polyamide compositions in which are blended an organo-phosphorus compound of general formula:

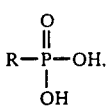

where R is a hydrocarbyl radical, and a metal compound which is an oxide, hydroxide or carboxylic acid salt of a metal from Groups 2a, 2b, 3b, 4b, 7a and 8 of the Periodic Table.

Although HB polymers and polyamides both yield structures which are typical of condensation polymers, HB polymers differ substantially from polyamides in terms of their chemical structures; intermolecular forces; physical properties including melting points, crystallinities and thermal stabilities; mechanical properties; solvencies and water resistances.

Materials used to date to nucleate HB polymers include particulates such as talc, micronised mica, boron nitride and calcium carbonate. These materials have proved effective in increasing the nucleation density, thereby increasing the overall rate of crystallization.

However, materials used to date have the following disadvantages:

1. Dispersion of the particles is often difficult; during processing, agglomeration often occurs, leading to inhomogenity in molding.
2. The presence of an agglomerated particle may give rise to a region of stress concentration, impairing the mechanical and barrier properties.
3. In films and to some extent in injection moldings of PHB polymers boron nitride has been found to act as a pigment giving opaque products when, particularly with films, transparent products are generally required.

In particular they have the disadvantage:

4. That, while conventional nucleants such as boron nitride may be satisfactory for nucleating copolymers containing low to medium proportions of comonomers such as hydroxyvalerate units, when these nucleants are used with copolymers containing high proportions of these comonomers the nucleating rates are diminished.

According to the present invention we provide a hydroxyalkanoate HA polymer composition which comprises (a) an HA polymer (as hereinafter defined), (b) an organophosphonic or organophosphinic acid or ester thereof or a derivative of said acid or ester as hereinafter defined, the acid having one of the structural formulae:

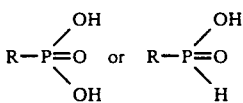

wherein R is an organic group, and (c) a metal compound selected from the group consisting of oxides, hydroxides and saturated or unsatured carboxylic acid salts of metals from Groups I to V of the Periodic Table.

Further according to the present invention we provide a process for the production of a hydroxyalkanoate HA polymer composition which comprises intimately blending together (a) an HA polymer (as hereinafter defined), (b) an organophosphonic or organophosphinic acid or ester thereof or a derivative of said acid or ester as hereinafter defined, the acid having one of the structural formulae:

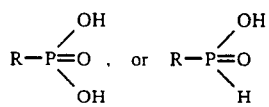

wherein R is a an organic group, and (c) a metal compound selected from the group consisting of oxides, hydroxides and saturated or unsaturated carboxylic acid salts of metals from Groups I to V of the Periodic Table.

In this specification by hydroxyalkanoate (HA) polymer we mean homopolymers with repeat units having the structure:

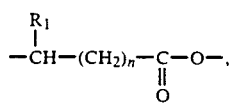

wherein $R_1$ is hydrogen or an alkyl group and n is an integer in the range 1 to 8 inclusive, and copolymers containing other hydroxyalkanoate units described above for HB copolymers provided that in such copolymers hydroxyalkanoate residues form at least part of the polymer chain.

Preferred HA polymers include the HB polymers defined above. They also include polymers containing hydroxyalkanoate residues having the structure:

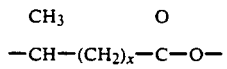

wherein x is an integer in the range 1 to 6 inclusive, which polymers are described in European Patent Application No. 90303119.3 and UK Patent Application Nos. 8909993.1 and 8922363.0.

In the HA polymer structure defined above $R_1$ is suitably an alkyl group containing 1 to 12 carbon atoms, preferably a methyl or an ethyl group, whilst n is preferably an integer in the range 1 to 5 inclusive, particularly in the range 1 to 3.

In this specification a derivative of an organophosphonic or organophosphinic acid or ester thereof is defined as any derivative of said acids or esters which, under the conditions applying when the HB polymer composition is formed into a film, fiber, coating or any shaped article, will react with the metal compound to produce the same effect as the free acids or esters.

In the process of the invention the components of the HA polymer composition may be blended together in any suitable manner. For instance they may simply be intimately mixed together at room temperature. The resultant composition is thereafter subjected to further heat treatment, e.g. by extrusion. We believe that during the further treatment a chemical reaction takes place between the organophosphonic or organophosphinic acid and the metal compound which produces a species which acts effectively as a nucleating compound in the composition.

Suitably the organophosphonic or organophosphinic acid, ester or derivative forming component (b) of the polymer composition is one in which R is a cycloaliphatic group or an aromatic group (although aliphatic groups are not excluded), cycloaliphatic and aromatic hydrocarbon groups being preferred. Preferably organophosphonic acids are used and in a particularly suitable organophosphonic acid, R is a cyclohexyl group.

Suitable metal compounds for component (c) include compounds of aluminum, antimony, tin, sodium, calcium and, preferably magnesium and zinc. Preferred carboxylic acid salts for the metal compound are stearates and palmitates. Compounds particularly preferred as metal compouds for component (c) are zinc stearate, magnesium stearate and zinc oxide.

The HA polymer composition of the invention may include hydroxyalkanoate homopolymers and copolymers containing hydroxyalkanoate residues together with a wide range of proportions of comonomer units. The invention in particular offers improvements for copolymers containing high proportions of comonomer residues in addition to hydroxyalkanoate residues, particularly 3-hydroxyvalerate residues. This is particularly the case when the hydroxyalkanoate residues are 3-hydroxybutyrate residues, i.e. the polymers are HB polymers.

Components (b) and (c) respectively may be included in the composition of the invention in a wide range of proportions relative to one another but for convenience relative proportions of a 1:1 molar ratio are preferred. Components (b) and (c) are conveniently mixed together and then added to the HB polymer component (a) in forming the composition of the invention. Suitably the total amounts of the components (b) and (c) which are together added to component (a) are in the range 0.1 to 5 parts per 100 parts of component (a) excluding any other components (i.e. per 100 of the resin or phr). Preferably components (b) and (c) together are added in the range 0.25 to 1.5 parts per 100 parts of component (a).

Conventional particulate nucleants may we believe have a different mode of activity to that observed for the nucleants used in the present invention. For low HV containing polymers both types of nucleant yield similar crystallization rates. However for high HV content polymers, nucleants such as boron nitride can be inefficient. Much higher crystallization rates are observed for the nucleant used in the present invention. This suggests that the mode of nucleation may be significantly different to that applying for particulate nucleants. The new nucleant has significant advantages over conventional particulate nucleants for the nucleation of high HV containing polymer.

The invention is illustrated by the Examples described below.

In the experiments described, differential scanning calorimetry (DSC) has been used to assess the efficiency of the nucleants. DSC is an analytical technique which allows the precise measurement of enthalpy changes during an endothermal or exothermal event. Thus, it is a useful technique to study the melting and crystallization behaviour of crystalline materials. If molten polymer is cooled at a constant rate, an exotherm may be produced as the polymer crystallizes. The temperature range over which the crystallization occurs, the area of the peak and the peak sharpness give an indication of the crystallization behaviour of the material. The addition of a nucleating agent generally causes an increase in the crystallization peak temperature and the peak area.

The following results were obtained on a Perkin Elmer DSC 4 apparatus. Heat-cool DSC was used to heat 7–10 mg samples from 20° C. at a constant rate of 20° C. min$^{-1}$, hold the samples at 205° C. for 2 minutes and then cool the samples at $-20°$ C. min$^{-1}$ to 20° C. The cooler temperature was maintained at $-50°$ C. throughout.

EXAMPLE 1

HB polymer containing 9% hydroxyvalerate units and having weight molecular weight of 560,000 was tumble mixed with measured quantities of cyclohexyl phosphonic acid as component (b) and various materials as component (c) as defined in Table 1. The mixtures were extruded through a 2.2 mm diameter die fitted to a Daventest melt flow index grader operating at a barrel temperature of 190° C. Samples were taken from the polymeric extrudate which had a residence time within the heated barrel of 6–7 minutes. These were then subjected to DSC analysis and the results from the cooling experiment are summarized in Table 1.

TABLE 1

| Additive | | Crystallisation Peak Minimum | Peak Area |
|---|---|---|---|
| Component (b) | Component (c) | Tc/°C. | Ec/Jg$^{-1}$ |
| None | None | 52.69 | −14.71 |
| Cyclohexyl phosphonic acid 0.05 phr | Zinc stearate 0.45 phr | 82.31 | −54.62 |
| Cyclohexyl phosphonic acid 0.05 phr | Zinc oxide 0.45 phr | 83.11 | −52.47 |
| Cyclohexyl phosphonic acid 0.05 phr | Magnesium stearate 0.45 phr | 73.54 | −55.05 |
| Cyclohexyl phosphonic acid 0.05 phr | Calcium stearate 0.45 phr | 66.85 | −48.58 |

(*Proportions defined in part per hundred resin i.e. parts per hundred of the polymeric component).

The material containing no additives crystallized to a small degree as indicated by the small exothermal peak area. Formulations containing cyclohexyl phosphonic acid showed a much higher degree of crystallinity and a higher peak minimum. The results for the nucleants of the invention show a significant improvement over the control without any nucleant.

EXAMPLE 2

HB polymer containing 7% hydroxyvalerate units and having weight molecular weight 580,000 was mixed with zinc stearate and different phosphonic acids as described in Table 2. The mixture was extruded as in Example 1. Samples taken from the extrudate were subjected to DSC analysis and the results are summarised in Table 2. The addition levels of the 2 components were calculated to yield a 1:1 molar ratio.

TABLE 2

| Component 1 | | Component (c) | Peak Minimum | Peak Area Ec/Jg$^{-1}$ |
|---|---|---|---|---|
| | Proportion | Proportion zinc stearate | | |
| None | 0 | 0 | 51.82 | −13.96 |
| Cyclohexyl phosphonic acid | 0.1 phr | 0.385 phr | 85.95 | −56.74 |
| Isopropyl phosphonic acid | 0.1 phr | 0.51 phr | 59.04 | −39.81 |
| t-butyl phosphonic acid | 0.1 phr | 0.46 phr | 64.27 | −23.35 |

The substituted phosphonic acids exhibited considerable improvements in nucleating efficiency compared with the unnucleated material. The order of activity of the substituents was R=cyclohexyl>isopropyl>t-butyl.

EXAMPLE 3

HB polymer containing 9% hydroxyvalerate units and having a weight molecular weight 560,000 was mixed with varying proportions of cyclohexyl phosphonic acid and zinc stearate to assess the effect of the mixture stoichiometry on the crystallisation properties. The DSC results obtained from an extrude obtained at 190° C. are summarized in Table 3.

TABLE 3

| Cyclohexyl phosphonic acid (A) | Zinc Stearate (B) | Molar Ratio (A):(B) | Peak Minimum Tc/°C. | Peak Area Ec/Jg$^{-1}$ |
|---|---|---|---|---|
| 0 | 0 | 0 | 52.69 | −14.71 |
| 0.05 phr | 0.45 phr | 0.43:1 | 82.31 | −54.62 |
| 0.05 phr | 0.30 phr | 0.64:1 | 83.96 | −53.71 |
| 0.05 phr | 0.15 phr | 1.28:1 | 82.87 | −54.73 |
| 0.10 phr | 0.15 phr | 2.57:1 | 78.96 | −52.41 |
| 0.15 phr | 0.15 phr | 3.85:1 | 78.61 | −52.43 |

The nucleant functions effectively over a wide range of cyclohexyl phosphonic acid:zinc stearate molar ratios.

EXAMPLE 4

Isothermal differential scanning calorimetry may be used to monitor crystallisation rates and to determine the optimum temperature for the maximum rate of overall crystallisation.

HB polymer containing 22% hydroxyvalerate units and having weight molecular weight 566,000 was extruded at 170° C. using an MFI grader as described in Examples 1-3. The resulting samples were subjected to isothermal DSC analysis for a range of temperatures. The samples were heated from 20° C. to 205° C. at 20° C. min$^{-1}$, held at 205° C. for 2 minutes and then cooled at −100° C. min$^{-1}$ to a defined crystallization temperature. This temperature was maintained for a period of up to 20 minutes and the crystallization exotherm recorded. The time taken for approximately half crystallization to take place and the area of the half peak are summarised in Table 4.

TABLE 4

| Crystallisation temperature °C. | 0.10 phr cyclohexyl phosphonic acid and 0.385 phr zinc stearate | | 1 phr boron nitride | |
|---|---|---|---|---|
| | Half crystallisation time/minutes | Area of half peak Jg$^{-1}$ | Half crystallisation time/minutes | Area of half peak/ Jg$^{-1}$ |
| 40 | 0.66 | −24.10 | 7.35 | −14.15 |
| 50 | 0.40 | −47.09 | 3.91 | −11.73 |
| 60 | 0.68 | −24.00 | 2.34 | −17.09 |
| 70 | 0.73 | −23.19 | 1.60 | −19.10 |
| 80 | 1.26 | −19.85 | 1.39 | −19.26 |

The results indicate that at crystallization temperatures of 80° C., boron nitride and the new nucleating materials yield similar polymer crystallization rates with similar energies of crystallization. At lower temperatures, the new nucleant yields significantly faster crystallization rates with improved energies of crystallization. The results indicate that it should be possible to use lower mold temperatures and shorter cycle times with the new nucleant. The nucleant used in the present invention shows significant improvements in nucleation efficiency for a high HV copolymer compound component with a conventional particulate nucleant.

EXAMPLE 5

Dry granules of a formulation containing HB polymer containing 17% hydroxyvalerate units and having weight molecular weight 800,000 were molded on a BOY 15S injection moulder into a standard impact and tensile test mould at a series of mold temperatures. The other molding conditions were set to yield th fastest possible cycle times. Izod impact tests and tensile stress-strain tests were performed on the test pieces, 7 days after moulding. The results are summarised in Tables 5 and 6.

The tensile testing was conducted on tensile bars using an Instron 1122. The sample gauge length was 40 mm. Izod impact test were conducted as defined in ASTM D256.

TABLE 5

| | Impact Strength | | | |
|---|---|---|---|---|
| | Izod Impact Strength/Jm$^{-1}$ for mould temperature | | | |
| Nucleant | 30° C. | 40° C. | 50° C. | 60° C. |
| 1 phr boron nitride | — | 191 | 203 | 214 |
| 0.10 phr cyclohexyl phosphonic acid + 0.385 phr zinc stearate | 244 | 280 | 317 | 314 |

Over the mould temperature range examined, the formulations containing the new nucleant were tougher and less brittle than formulations containing boron nitride.

TABLE 6

| | Young's modulus | | | |
|---|---|---|---|---|
| | Young's modulus Mpa for mould temperature | | | |
| Nucleant | 30° C. | 40° C. | 50° C. | 60° C. |
| 1 phr boron nitride | — | 646 | 617 | 582 |
| 0.10 phr cyclohexyl phosphonic acid + 0.385 phr zinc stearate | 673 | 666 | 636 | 591 |

The new nucleant yielded similar but higher Young's modulus over the mold temperature range 30°-60° C. This fact coupled with the shorter molding cycle times obtained with the new nucleant, demonstrate considerable advantages over boron nitride for high HV copolymer.

We claim:

1. A hydroxyalkanoate HA polymer composition which comprises (a) a hydroxyalkanoate polymer, (b) an organophosphonic or organophosphinic acid or ester thereof or a derivative of said acid or ester, the acid having a structural formula selected from the group consisting of:

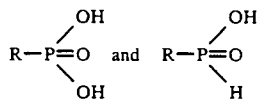

wherein R is an organic group, and (c) a metal compound selected from the group consisting of oxides, hydroxides and saturated or unsaturated carboxylic acid salts of metals from Groups I to V of the Periodic Table.

2. A polymer composition according to claim 1 wherein the HA polymer is a 3-hydroxybutyrate.

3. A polymer composition according to claim 1 wherein the HA polymer is a polymer containing hydroxyalkanoate residues having the structure:

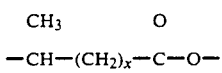

wherein x is an integer in the range 1 to 6 inclusive.

4. A process for the production of a hydroxyalkanoate HA polymer composition which comprises intimately blending together (a) a hydroxyalkanoate polymer, (b) an organophosphonic or organophosphinic acid or ester thereof or a derivative of said acid or ester, the acid having a structural formula selected from the group consisting of:

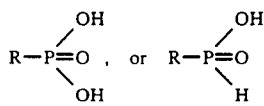

wherein R is a an organic group, and (c) a metal compound selected from the group consisting of oxides, hydroxides and saturated or unsaturated carboxylic acid salts of metals from Groups I to V of the Periodic Table.

5. A process according to claim 4 wherein component (b) is an organophosphonic acid or ester thereof or a derivative of said acid or ester in which R is a cycloaliphatic group or an aromatic group.

6. A process according to claim 5 wherein R is a cyclohexyl Group.

7. A process according to claim 4 wherein component (c) is a compound of a metal selected from the group consisting of aluminum, antimony, tin, sodium and calcium.

8. A process according to claim 4 wherein component (c) is a compound of a metal selected from the group consisting of magnesium and zinc.

9. A process according to claim 4 wherein component (c) is a metal compound selected from the group consisting of stearates any palmitates.

10. A process according to claim 8 wherein component (c) is a metal compound selected from the group consisting of zinc stearate, magnesium stearate and zinc oxide.

11. A process according to claim 4 wherein components (b) and (c) together are added in the range 0.25 to 1.5 parts per 100 parts of component (a).

* * * * *